US009083916B2

(12) United States Patent  
Castellan et al.

(10) Patent No.: US 9,083,916 B2  
(45) Date of Patent: Jul. 14, 2015

(54) GENERATION OF A CUSTOMIZABLE TV MOSAIC

(75) Inventors: Pierre-Yves Castellan, Rennes (FR); Elisabeth Lepoil, Chanteple (FR); Laurent Chatelier, Geveze (FR)

(73) Assignee: Orange, Paris (FR)

( * ) Notice: Subject to any disclaimer, the term of this patent is extended or adjusted under 35 U.S.C. 154(b) by 581 days.

(21) Appl. No.: 12/601,312

(22) PCT Filed: May 28, 2008

(86) PCT No.: PCT/FR2008/050931  
§ 371 (c)(1), (2), (4) Date: Nov. 23, 2009

(87) PCT Pub. No.: WO2008/152303  
PCT Pub. Date: Dec. 18, 2008

(65) Prior Publication Data  
US 2010/0171881 A1     Jul. 8, 2010

(30) Foreign Application Priority Data

May 30, 2007    (FR) .................................. 07 55333

(51) Int. Cl.
| | |
|---|---|
| H04N 9/74 | (2006.01) |
| H04N 5/445 | (2011.01) |
| H04N 21/431 | (2011.01) |
| H04N 21/482 | (2011.01) |
| H04N 21/422 | (2011.01) |
| H04N 21/485 | (2011.01) |

(52) U.S. Cl.  
CPC ....... *H04N 5/44591* (2013.01); *H04N 5/44543* (2013.01); *H04N 21/4312* (2013.01); *H04N 21/482* (2013.01); *H04N 21/42204* (2013.01); *H04N 21/4858* (2013.01)

(58) Field of Classification Search  
USPC .......................................... 348/584, 588, 598  
See application file for complete search history.

(56) References Cited

U.S. PATENT DOCUMENTS

| | | | | |
|---|---|---|---|---|
| 5,633,683 | A * | 5/1997 | Rosengren et al. ...... | 375/240.01 |
| 5,978,043 | A * | 11/1999 | Blonstein et al. ............. | 348/569 |
| 6,384,869 | B1 * | 5/2002 | Sciammarella et al. ...... | 348/564 |
| 6,405,371 | B1 * | 6/2002 | Oosterhout et al. ............ | 725/39 |
| 6,732,371 | B1 * | 5/2004 | Lee et al. ........................ | 725/41 |
| 7,061,549 | B1 * | 6/2006 | Mabon ......................... | 348/731 |
| 7,164,714 | B2 * | 1/2007 | Martin ..................... | 375/240.01 |

(Continued)

FOREIGN PATENT DOCUMENTS

| | | | |
|---|---|---|---|
| EP | 1 233 614 A1 | | 8/2002 |
| EP | 1233614 A1 | * | 8/2002 |

(Continued)

*Primary Examiner* — Jefferey Harold  
*Assistant Examiner* — Humam Satti  
(74) *Attorney, Agent, or Firm* — Drinker Biddle & Reath LLP (57) ABSTRACT

Method for generating at least one mosaic of content-transport streams, said method comprises the following steps after displaying a screen including at least a first area (Z1) intended for displaying a mosaic and a second area (Z2) comprising a content identifier list: a/ detecting a command for selecting an identifier from a list coming from a user control interface; b/ modifying the screen definition (E2) by adding a mosaic element (Em1) showing the stream representing the content identified by the selected identifier in the first area (Z1); c/ transmitting the screen definition data to the display device for displaying the modified screen.

9 Claims, 3 Drawing Sheets

(56) References Cited

U.S. PATENT DOCUMENTS

| | | | |
|---|---|---|---|
| 7,600,189 B2* | 10/2009 | Fujisawa | 715/765 |
| 7,757,252 B1* | 7/2010 | Agasse | 725/41 |
| 7,831,987 B2* | 11/2010 | Shikata et al. | 725/41 |
| 8,005,838 B2* | 8/2011 | Van Flandern et al. | 707/736 |
| 8,056,099 B2* | 11/2011 | Shanks et al. | 725/41 |
| 8,056,102 B2* | 11/2011 | Lee | 725/56 |
| 8,307,399 B2* | 11/2012 | Lee | 725/62 |
| 8,332,889 B2* | 12/2012 | Calzone | 725/43 |
| 8,402,488 B2* | 3/2013 | Craner | 725/45 |
| 8,413,185 B2* | 4/2013 | Carpenter et al. | 725/38 |
| 8,683,519 B2* | 3/2014 | McCarthy et al. | 725/44 |
| 2002/0154692 A1* | 10/2002 | Martin | 375/240.01 |
| 2003/0014752 A1* | 1/2003 | Zaslavsky et al. | 725/40 |
| 2004/0194135 A1* | 9/2004 | Kahn | 725/38 |
| 2004/0207766 A1* | 10/2004 | Sata et al. | 348/734 |
| 2005/0111829 A1* | 5/2005 | Ito et al. | 386/69 |
| 2006/0039481 A1* | 2/2006 | Shen et al. | 375/240.25 |
| 2006/0230427 A1* | 10/2006 | Kunkel et al. | 725/133 |
| 2006/0282852 A1* | 12/2006 | Purpura et al. | 725/39 |
| 2007/0011702 A1* | 1/2007 | Vaysman | 725/45 |
| 2007/0107018 A1* | 5/2007 | Song et al. | 725/69 |
| 2007/0171306 A1* | 7/2007 | Lowet et al. | 348/565 |
| 2007/0188655 A1* | 8/2007 | Ohta | 348/389.1 |
| 2007/0250865 A1* | 10/2007 | Krakirian | 725/58 |
| 2009/0037966 A1* | 2/2009 | Rolls et al. | 725/105 |
| 2009/0049483 A1* | 2/2009 | Townsend et al. | 725/60 |
| 2009/0079872 A1* | 3/2009 | Seong et al. | 348/588 |
| 2009/0100361 A1* | 4/2009 | Abello et al. | 715/764 |
| 2011/0249177 A1* | 10/2011 | Chen | 348/388.1 |

FOREIGN PATENT DOCUMENTS

| | | |
|---|---|---|
| FR | 2 813 693 A1 | 3/2002 |
| WO | WO 01/56293 A1 | 8/2001 |
| WO | WO 01/74051 A2 | 10/2001 |
| WO | WO 2006/081577 A2 | 8/2006 |

* cited by examiner

GENERATION OF A CUSTOMIZABLE TV MOSAIC

CROSS-REFERENCE TO RELATED APPLICATIONS

This application is the U.S. national phase of the International Patent Application No. PCT/FR2008/050931 filed May 28, 2008, which claims the benefit of French Application No. 07 55333 filed May 30, 2007, the entire content of which is incorporated herein by reference.

FIELD OF THE INVENTION

The present invention relates to the field of content-stream receivers, for example television-program receivers. Such a receiver receives data streams consisting of television programs, decodes them, then supplies them to a display device which, depending on the case, may or may not be integrated into the receiver.

BACKGROUND OF THE INVENTION

As a result in particular of the arrival of digital television, the number of television (TV) channels on offer to the user of a TV receiver has increased considerably.

TV mosaics allow the user of a TV receiver to view more rapidly all of the TV programs currently being broadcast on the different channels, without having to consult as many screens as there are channels available.

We consider in this case the mosaics having mosaic elements is juxtaposed such that each mosaic element makes it possible to view, in a reduced format, a content stream, for example a TV program, being broadcast on a channel associated with the mosaic element. Thus, when a mosaic is displayed by the display device, the user views on the same screen a set of the programs broadcast by the channels associated with the mosaic elements of the mosaic.

The video signal viewed via a mosaic element of a mosaic is generally obtained by subsampling of the video signal corresponding to the program.

Generally, the TV channel package provider determines beforehand the N channels which will appear in reduced form in a given mosaic (for example, N is equal to 20 and the mosaic comprises four horizontal rows of mosaic elements, each row comprising five mosaic elements).

The video signal corresponding to each program being broadcast on each of the N channels is firstly subsampled. A mosaic program stream is then constituted as a function of the subsampled video signals. This program stream corresponds to the mosaic screen of the N juxtaposed mosaic elements, each displaying in reduced format the program being broadcast by a respective channel. This mosaic program stream is then broadcast by the provider of packages intended for television receivers, in parallel with broadcasting the streams comprising the original video signals which correspond to the programs being broadcast on the channels.

When a TV channel package provider broadcasts a number of channels greater than the number of mosaic elements which can be juxtaposed on a mosaic screen (in fact the size of a mosaic element must not be too small for it to be viewable when the mosaic is displayed on a TV screen), said provider then broadcasts several mosaics.

When a user subscribes to several package providers, he also receives several mosaics corresponding to the respective providers.

The user therefore has to display several mosaics successively in order to consult the programs broadcast on his favourite channels, which is tedious.

Moreover, the composition of each mosaic is determined by the TV is channel package operator and does not always correspond to the needs of users.

The document WO 2006/081577 describes an electronic program guide composed of dynamic video stream mosaics capable of integrating metadata from different customizable sources. In particular, it proposes a so-called "favourites" mosaic which dynamically integrates video streams corresponding to the user's preferences. Moreover, the user can introduce video stream sources other than that of the video service provider, which will be taken into account during generation of the electronic program guide. The mosaic is generated by the system so as to satisfy the user's preference criteria. The customization system thus proposed can prove to be complex depending on the number and subtlety of the preference criteria and the number of video streams available.

SUMMARY OF THE INVENTION

According to a first aspect, the invention proposes a method for generating at least one content-transport stream mosaic.

The method comprises the following steps, after displaying a screen comprising at least a first area intended for displaying a mosaic and a second area comprising a content identifier list:
  a/ detecting a command selecting an identifier from the list coming from a user control interface;
  b/ modifying the definition of the screen by adding a mosaic element showing the stream representing the content identified by the selected identifier;
  c/ transmitting the screen definition data to the display device for displaying the modified screen.

Thus the method for allowing a user to define all or part of the content of the mosaic is rapid, simple and practical.

The same screen simultaneously displays the mosaic and an available content identifier list for display of the corresponding mosaic element in the mosaic.

The user thus has available on the same screen all of the elements for defining his mosaic. Once a content identifier has been selected in the second is area of the screen, he can view on the same screen in the first area, his updated mosaic, comprising a new mosaic element corresponding to the content selected.

Such a method thus allows a user himself to define, in a very short time and with very few operations required, all or part of a mosaic and choose to include all or some of his favourite channels in the same mosaic. By "channel" is meant both TV channels and radio stations or other entities transmitting multimedia programs.

In an embodiment, when the command moreover indicates a determined location in the first area, the definition of the screen is modified by adding a mosaic element in the first area, showing the stream representing the content identified by the selected identifier at the location indicated.

Such an arrangement thus allows the display, at a location in the first area defined by the user, of a mosaic element showing the stream representing the content that he has selected. He thus defines the mosaic element of his choice at the location of his choice.

In an embodiment, when the command also indicates a movement from the identifier selected from the list to a determined location in the first area. The definition of the screen is then modified successively by adding a representation of the selected identifier and moving it into successive respective positions along the movement indicated. The screen definition data are transmitted to the display device in order to display the successively modified screen.

Such an arrangement allows the user to view on the screen, as the movement indicated proceeds using the control interface, the corresponding movement of the representation of the identifier, before choosing the final location at which the user wishes the mosaic element to be available corresponding to the content identified by the identifier.

In an embodiment, the method comprises a prior step of determining, among the contents, those authorized for viewing, the identifiers of the list to be displayed in the second area being the determined content identifiers.

In an embodiment, following the detection of at least one command is coming from the control interface, indicating scrolling in a given direction of the list of identifiers, the method implements the following steps:

the definition of the screen is modified by removing at least one content identifier previously displayed at one end of the list in the second area and by adding at least one content identifier not previously displayed in the list to the other end of the list;

the screen definition data are transmitted to the display device in order to display the modified screen.

Therefore, when numerous channels are available, the user can thus view the mosaic and all of the channel identifiers on the same screen, as the scrolling of the list progresses.

In an embodiment, the method also comprises the following steps:

detecting a command, coming from the control interface, indicating a content represented in a mosaic element on the displayed screen;

modifying the definition of the screen by removing at least the mosaic element representing the content indicated in the first area;

transmitting the screen definition data to the display device in order to display the modified screen.

This arrangement makes it possible, while continuing to view the mosaic, to modify its content, in this case by removing a mosaic element previously included in the mosaic.

In an embodiment, the method also comprises the following steps:

detecting a command, coming from the control interface, selecting a mosaic element situated at a first determined location in the first area and indicating a movement from the first location to a second location in the first area;

successively modifying the definition of the screen by moving the selected mosaic element into successive respective positions along the movement indicated; and    transmitting the screen definition data to the display device in order to display the successively modified screen.

This arrangement makes it possible, while continuing to view the mosaic, to modify its content, in this case by moving a mosaic element of the mosaic towards a new location in the mosaic.

According to a second aspect, the invention proposes a computer program to be installed in a module capable of receiving content-transport streams, capable of receiving commands transmitted from a control interface and capable of sending screen definition data to a display device in order to display the thus-defined screen, said program comprising instructions for implementing the steps of a method according to the first aspect of the invention during execution of the program by processing means of said module.

According to a third aspect, the invention proposes a module capable of receiving content-transport streams, capable of receiving commands transmitted from a control interface and capable of sending screen definition data to a display device in order to display said screen, said module being suitable for implementing the steps of a method according to the first aspect of the invention.

According to a fourth aspect, the invention proposes a television receiver comprising a module according to the third aspect of the invention.

According to a fifth aspect, the invention proposes a screen comprising at least a first area intended for the display of a content-transport stream mosaic and a second area comprising a content identifier list, said screen being obtained following the implementation of a method according to the first aspect of the invention.

BRIEF DESCRIPTION OF THE DRAWINGS

Other characteristics and advantages of the invention will also become apparent on reading the following description. This is purely illustrative and must be read with reference to the attached drawings in which:

FIGS. 3.1 to 3.4 show screens in an embodiment of the invention.

DETAILED DESCRIPTION

Figure 1:
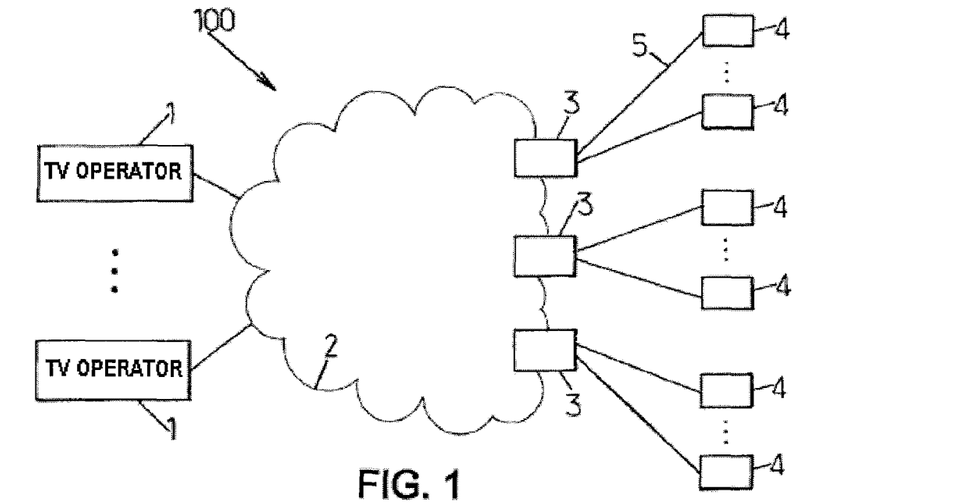
FIG. 1 shows a system in an embodiment of the invention.

FIG. 1 shows a system 100 comprising one or more content broadcasters 1 such as television operators, a transport network 2 and receiving and representation systems 4, in particular television sets in our example. The transport network in our example is the ADSL network. Other networks can be envisaged such as internet, satellite, wireless, radio, cable, optical fibre networks etc.

In an embodiment, the transport network 2 comprises devices 3, in particular demodulators such as those used by Wifi, ADSL modems etc., connected to television sets 4.

For example the devices 3 are of ADSL modem type, also known as DSLAMs "Digital Subscriber Line Access Multiplexers" and they are connected to the television sets 4 by respective ADSL type lines ("Asymmetric Digital Subscriber Line").

In an embodiment, a TV operator receives programs from n different TV channels CH1 to CHn. Each program from channel CHi, i=1 to n, is encoded, for example according to the MPEG-4 standard, in the form of an SPTS-type stream ("Single Program Transport Stream"). An SPTS data stream, for example corresponding to a bit rate of 2.2 Mb/s, comprises the encoded data defining the video signal of a program and the different audio signals and is intended to be viewed in full screen on a television set.

In what follows, the SPTS stream determined for the program of the channel Chi is referenced SPTSi, i=1 to n.

For example n is equal to 50.

In the embodiment considered, the operator also determines n video signals representing, in reduced format (for example equal to 1/N), the programs of the n different channels. These video signals are intended to be viewed within a mosaic element of a TV mosaic.

These n video signals are also encoded in the form of n SPTS's by the operator. The SPTS corresponding to the reduced format of the program of the channel CHi, i=1 to n, is referenced SPTS'i. The bit rate of such a stream SPTS'i is for example 200 Kb/s.

Then the different SPTS's, corresponding to the programs of the channels (SPTSi, i=1 to n) and to the video signals of the mosaic elements (SPTS'i, i=1 to n), are multiplexed, then transported over the network 2 to the DSLAM devices 3.

The DSLAM devices 3 receiving the SPTS multiplexes from the different operators, carry out a demultiplexing operation and obtain the different SPTS's, so as to supply them to the television sets 4 which are connected to them in order to display the programs selected by the users of the television sets 4.

Figure 2:
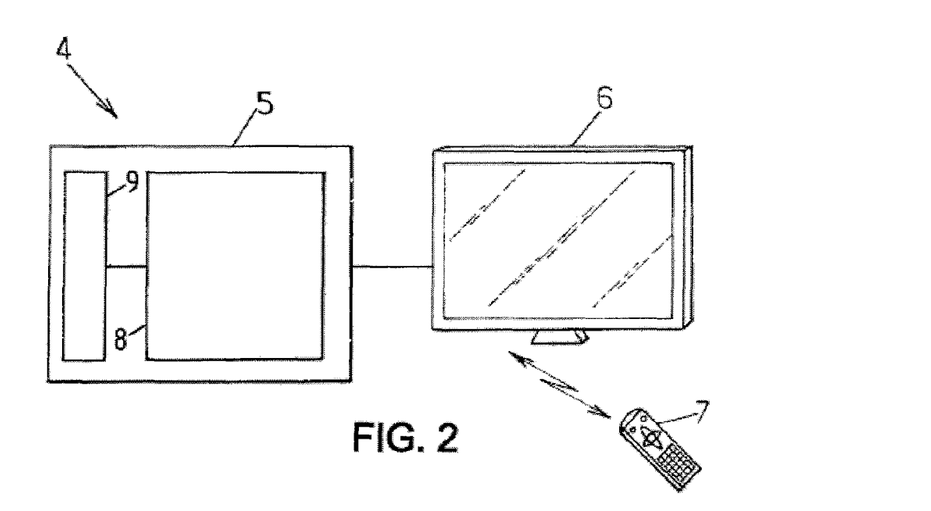
FIG. 2 shows a television set in an embodiment of the invention.

With reference to FIG. 2, a television set 4 comprises a TV receiver 5 connected to a display device 6, which may or may not be integrated. In the latter case, the TV receiver is for example a "set-top-box".

The TV receiver 5 comprises an interface 9 suitable for exchanging data with the DSLAM device 3 to which the television set 4 is connected. It also comprises a processing module 8 suitable for defining screen definition data, for transmission thereof to the display device 6 in order to display the thus-defined screen.

The processing module 8 comprises inter alia a graphics application and a memory (not shown).

A control interface 7 such as a remote control, for example infrared, is suitable for transmitting commands input by the user of the television set 4 to the TV receiver 5 using the keys on the remote control. These keys include for example the "menu", "OK", "left"/"right"/"up"/"down" arrow keys, figures "0" to "9" etc.

For example, when the user presses the key "2" of the remote control 7, the remote control transmits the corresponding command to the TV receiver 5. The processing module 8 then sends, via the interface 9, a command intended for the DSLAM device 3, requesting the supply of the SPTS (SPTS2) corresponding to the channel CH2 program. In response, the DSLAM device 3 transmits the SPTS 2 currently being broadcast to the processing module 8 of the television set 4. The data received are then decoded, then supplied to the display device for the full-screen display of the channel CH2 program.

In an embodiment, when the user presses the "menu" key, the processing module 8 then determines, using the graphics application with which it is equipped and stored data, data for the definition of a screen E0 displaying inter alia a "create new mosaic" field and a cursor positioned on this screen, then transmits these definition data to the display device 6.

The cursor consists for example of an arrow pointing to an element to be selected or also highlighting the element to be selected.

Once the screen E0 is displayed by the display device 6, the user can move the displayed cursor using the "arrow" keys of the remote control 7. After an "arrow" key in a given direction is pressed, the remote control 7 sends a corresponding command to the processing module 8 which, using the graphics application and screen definition data currently being displayed, defines a new screen in which the cursor is moved in a direction according to the command received. Then the definition data of this new screen are transmitted for display, instead of the previous screen, on the display device 6.

If, using the "arrow" keys of the remote control 7, the user positions the cursor on the "create new mosaic" field, then selects this field (for example by pressing the "OK" key of the remote control) using the remote control 7, then the control module 8 defines a screen representing an alphanumeric keyboard, a cursor, an empty field, a field inviting the user to indicate using the remote control 7, the save name of the new mosaic and a "save" field.

In the case considered, the user will thus select the characters of the expression "My Mosaic" one by one on the displayed screen, using the keys of the remote control, then validate the name thus indicated by selecting the "save" field. The save name of the new mosaic is stored in the memory of the processing module 8.

In another embodiment, a save name of a new mosaic currently being created is proposed by default in a field appearing on the screen and filled in with a predetermined name (such as "personal mosaic No. X", where X is a figure or a letter incremented with each new creation) inviting the user to validate or modify the save name proposed for the new mosaic.

In another embodiment, it is not possible for the user to input a save name. The save name is compulsorily assigned by the receiver 5 (for example by aggregation of the user's acronym and the date of creation of the new mosaic).

In an embodiment, the save name is assigned, not before the creation, but after the creation of the mosaic, thus making it possible to create a new mosaic by modifying an old saved mosaic.

Moreover, in the case considered, the processing module 8 is suitable for transmitting a command to the DSLAM device 3 requesting a list of identifiers of the channels transmitted to the DSLAM device 3 and which the user of the television set 4 has the right to access. In response, the DSLAM device 3 transmits to the processing module 8 the list of the k identifiers (k being less than or equal to n) of channels which the user of the television set 4 has the right to access. It is assumed below that the user of the television set 4 has rights to the k channels CH1 to CHk. In the embodiment considered, a screen E1 is then displayed by the display device 6, following the supply of definition data of the screen E1 determined by the processing module 8 using data stored in the memory and the graphics application.

Figure 31:
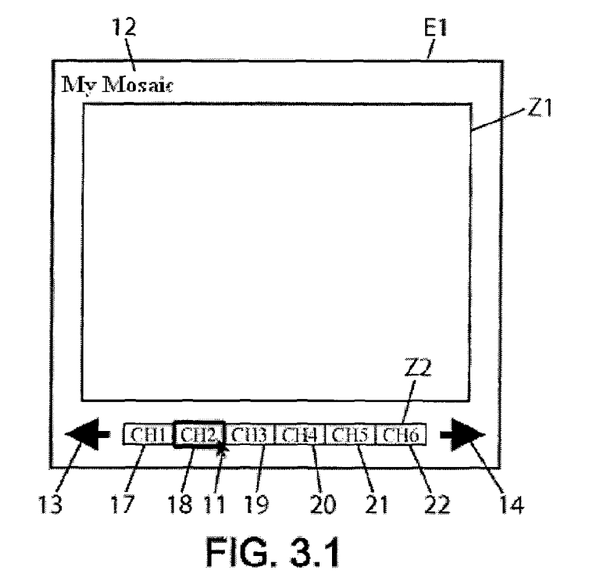

With reference to FIG. 3.1, the screen E1 comprises a cursor 11, a field 12 indicating the name of the new mosaic "My Mosaic", a first area Z1 intended for the display of a mosaic and a second area Z2 comprising a list of program identifiers.

The area Z1 represented here comprises at the most N mosaic elements. For example in the case represented, it can comprise up to 20 mosaic elements arranged in 4 lines, each of 5 mosaic elements.

The area Z2 comprises a portion of a scrolling list. The area Z2 comprises fields 17, 18, 19, 20, 21 and 22, indicating, in the case considered the respective identifiers CH1 to CH6.

In the case considered, using the "arrow" keys of the remote control 7, the user positions the cursor 11 on the field 18 comprising the channel CH2 identifier, then selects this field (for example by pressing the "OK" key of the remote control 7) using the remote control 7. With reference to FIG. 3.1, the outline of the selected field 18 appears in bold.

When the processing module 8 receives this command indicating the selection of the channel CH2 identifier, it then transmits a command to the DSLAM device 3 via the interface 9, requesting the supply of the SPTS (SPTS'2) video signal corresponding to the reduced format of the channel CH2 program. In response, the DSLAM device 3 transmits the SPTS'2 to the processing module 8. The data received are then decoded by the processing module 8.

Once the field 18 comprising the channel CH2 identifier has been selected, the user, still using the "arrow" keys of the remote control 7, commands a movement to be applied to a representation of the channel CH2 identifier from its position in the list Z2 to a desired location in the area Z1. Each new press on an "arrow" key is a command received by the processing module 8, which then defines, using the graphics application and screen definition data currently being displayed, a new screen in which a representation of the channel CH2 identifier is moved in a direction according to the command received. Then the definition data of this new screen are transmitted for display, instead of the previous screen, on the display device 6.

Once the desired location in the area Z2 is reached by the representation of the channel CH2 identifier, the user indicates that the movement is completed, for example by pressing the "OK" key of the remote control. In the case considered, the desired location corresponding to the last position (of the N positions) in the first line.

Figure 32:
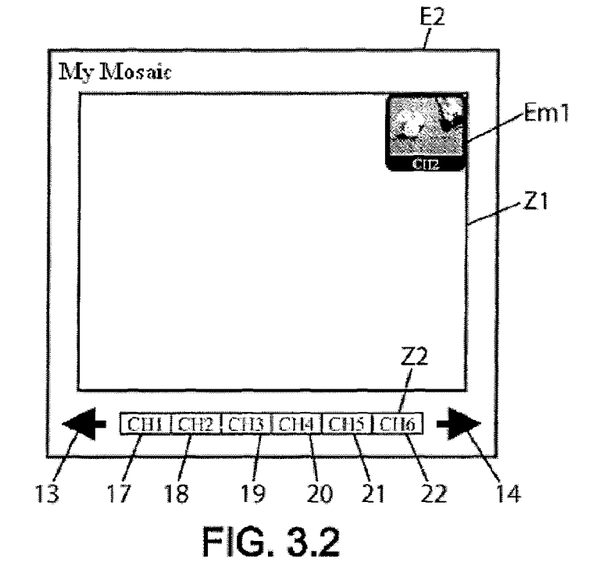

When the processing module 8 receives this command indicating the location desired by the user for the location of the mosaic element displaying the channel CH2 program selected, it then defines, using the graphics application, definition data of the current screen displayed and decoded data coming from the SPTS'2, a new screen E2 represented in FIG. 3.2. This screen E2 comprises, in addition to the screen previously displayed, a mosaic element Em1 situated at the location indicated by the user displaying the channel CH2 program in reduced format. Then the processing module 8 transmits these definition data of the screen E2 to the display device 6, which then displays this screen instead of the screen previously displayed.

In the embodiment considered with reference to FIGS. 3.1 and 3.2, the screens comprising the area Z1 for the display of the mosaic elements and the area Z2 in order to display program identifiers also comprises a field 13 on the left of the list Z2 representing an arrow pointing left and a field 14 on the right of the list Z2 representing an arrow pointing right.

When the user positions the cursor 11 on one of the arrows 13, 14 and selects said arrow, the channel identifiers indicated by the fields in the area Z2 are shifted one field.

Figure 33:
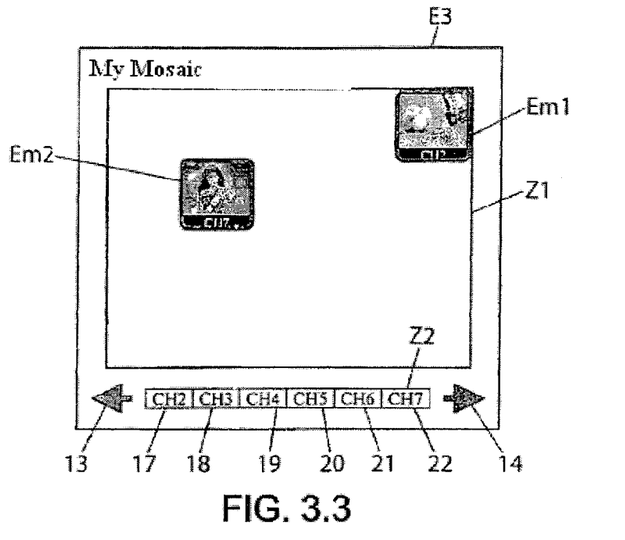
Figure 34:
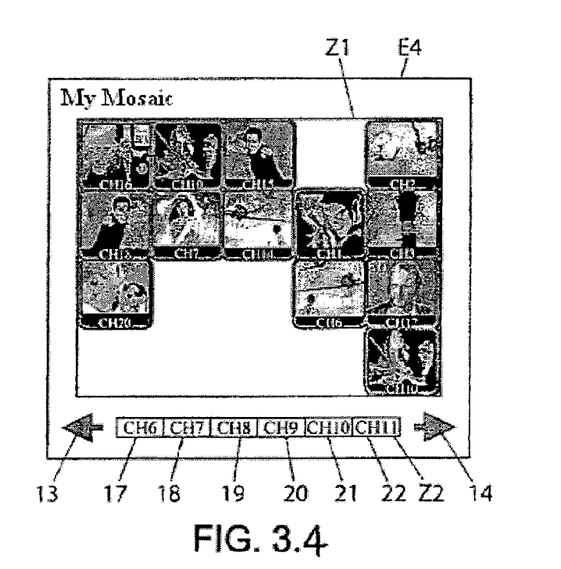

For example, if the user selects with reference to FIG. 3.2, the arrow 14, then the content of the fields 17 to 22 is modified as shown in FIG. 3.3: the field 21 then indicates the identifier of channel CH6, the field 20 that of channel CH5, the field 19 that of channel CH4, the field 18 that of channel CH3, the field 17 that of channel CH2. And the field 22 indicates the identifier of channel CH7.

If the user had selected, with reference to FIG. 3.2, the arrow 13, then the content of the fields 17 to 22 would have been modified as follows: the field 22 would indicate the identifier of channel CH5, the field 21 would indicate the identifier of channel CH4, the field 20 that of channel CH3, the field 19 that of channel CH2, the field 18 that of channel CH1, the field 17 that of channel CHk.

Thus, in both cases, the selection of an arrow 13 or 14 results in the removal of a TV channel identifier previously displayed at one end of the list of identifiers displayed in the area Z2 and the display at the other end of the list of an identifier which was not previously displayed.

Such access, using a scrolling list, from the screen showing the mosaic to all of the programs of channels CH1 to CHk which the user has the right to access, allows him to insert the mosaic element corresponding to any TV channel of his choice, while still keeping on the screen the mosaic currently being constituted.

By repeating operations similar to those described above in order to insert the mosaic element Em1 corresponding to the channel CH2 program in reduced format, the user can add several mosaic elements at desired locations within the area Z2. For example, with reference to FIG. 3.3, the mosaic element Em2 corresponding to the channel CH7 program, in reduced format, has been added to the mosaic "My Mosaic" in the area Z1 of the screen E3.

In an embodiment, the user can moreover move one or more mosaic elements inserted into his mosaic.

To this end, using the cursor 11 and keys of the remote control 7, the user selects one of the present mosaic elements which he wishes to move, for example the mosaic element Em1, for example by pressing the "OK" key of the remote control 7, once the cursor 11 is positioned on the mosaic element.

Then using the "arrow" keys of the remote control 7, the user commands a movement to be applied to the mosaic element Em1 from its initial position to another desired location in the area Z1. Each new press on an "arrow" key is a command received by the processing module 8, which then defines, using the graphics application and screen definition data currently being displayed, a new screen in which the mosaic element Em1 is moved in a direction according to the command received. Then the definition data of this new screen are transmitted for display, instead of the previous screen, on the display device 6.

Once the cursor 11 reaches the other desired location in the area Z1, the user indicates that the movement is completed, for example by pressing the "OK" key of the remote control. When the processing module 8 receives this command indicating the location desired by the user for the new location of the mosaic element Em1, it then defines a new screen, using the graphics application, definition data of the screen currently displayed and decoded data coming from the SPTS'2, such that the mosaic element Em1 now appears at the new location in the area Z1 and no longer at the initial location corresponding to the Nth position in the first line.

The user also has the possibility of removing a mosaic element present in the area Z1. In an embodiment, in order to do this, he only has to use the cursor 11 and keys of the remote control 7, to select that one of the present mosaic elements that he wishes to remove, for example by pressing the "OK" key of the remote control 7, once the cursor 11 is positioned on the mosaic element.

Then using the "arrow" keys of the remote control 7, the user commands a movement to be applied to the selected mosaic element from its initial position to any location whatever outside the area Z1. Each new press on an "arrow" key is a command received by the processing module 8, which, using the graphics application and screen definition data currently being displayed, then defines a new screen in which the mosaic element is moved in a direction according to the command received. Then the definition data of this new screen are transmitted for display, instead of the previous screen, on the display device 6.

Once the cursor 11 reaches a location outside the area Z1, the user indicates that the movement is completed, for example by pressing the "OK" key of the remote control.

When the processing module 8 receives this command indicating the location desired by the user for locating the mosaic element displaying the selected channel CH2 program, it then defines, using the graphics application, definition data of the screen currently displayed and decoded data coming from the SPTS'2, a new screen such that the selected mosaic element is removed.

Other procedures can be defined for removing a mosaic element (for example, by pressing a determined key of the remote control 7 after selection of the mosaic element).

The present invention thus makes it possible for a television set user simply and rapidly to customize a mosaic by including mosaic elements for programs selected by the user.

The customization of the mosaic is easy to implement, the user viewing the mosaic currently being constituted and a list of available programs on the same screen. Thus the user does not need to navigate from one screen to another in order to define his mosaic. Once he inputs from his remote control a command for selection of a program identifier in the second area of the screen, for removal or movement of a mosaic element in the first mosaic area on the basis of a displayed screen, the user can view the result of his command on the screen displayed by the display device.

The generation of a screen comprising a mosaic page is described below. In an embodiment, the user is able to create several mosaic pages, for example a mosaic intended for children, a mosaic intended for programs that he likes watching in the evening etc. These mosaic pages are for example intended to be displayed on different screens. In such a case, the screen E0 comprises, apart from the "create new mosaic" field, fields each comprising the name of a mosaic which has already been created. Following the selection of one of the fields comprising the name of a mosaic which has already been created, a screen comprising a first area with the mosaic elements already defined for this mosaic and a second area with the available programs is displayed. The same operations as those described above with reference to the mosaic "My Mosaic" can then be carried out.

In an embodiment, the screen E0, as initially shown to a user wishing to create a mosaic, comprises mosaic elements displaying programs of channels predefined by the operator. For example, the processing module is suitable for including mosaic elements corresponding to the channels CH1 and CH2, the N−2 other mosaic elements can be selected by the user.

In the embodiment described above, the user chooses not only all or some of the streams shown in the mosaic, but also the location of the mosaic elements relating to these chosen streams. In another embodiment, the user chooses the streams shown in the mosaic, but not their location.

In the embodiment described above with reference to the figures, the list of identifiers is a scrolling list a portion of which is displayed in the area Z2. In another embodiment, the list of identifiers is a hierarchical list. If for example it is a hierarchical list arranged by themes, the first hierarchical level of the list appearing first in the area Z2 shows for example the following themes: "series", "film", "sport" etc. If the user, using the cursor, selects the theme "series" in the area Z2, a second hierarchical level of the displayed list then shows the list of the identifiers of the stream identified under this theme. If for example it is a statistically hierarchical list, the first hierarchical level appearing first in the area Z2 shows for example the following statistical categories: "<30%", "30-70%", ">70%" relating to the frequency of use of the is contents by the user. If the user selects the category ">70%", a second hierarchical level of the list displayed then shows the list of the identifiers of contents for which the frequency of use by the user is greater than 70%.

The invention is described above in an application for an ADSL-type TV program broadcasting network. Nevertheless, the invention can be implemented in any TV, radio or multimedia program broadcasting environment, for example by satellite or wireless digital network.

In an embodiment, the television set 4 is suitable for receiving channels from different operators via the same device 3 or via respective devices 3. The processing module 8 is then suitable for acquiring from the devices 3 the program identifiers respectively transmitted by the operators, for merging these identifiers within a single list intended for display in the area Z2, and thus making it possible for a user to create a mosaic comprising the mosaic elements corresponding to channels from separate operators.

In an embodiment, the list of identifiers of the streams transmitted to the receiver 5 comprises the identifiers of the streams which the user of the television set 4 has the right to access as well as at least some of the streams to which he has no right, such as a "pay TV" stream, for which it is possible to purchase access to the broadcast content. If, when viewing the mosaic comprising a mosaic element relating to this stream, the user notes that the content broadcast by this pay TV interests him, he can purchase access to this content. The purchase of the access to this content is made either directly from the mosaic, by simple selection of the mosaic element relating to the pay TV, which will result in the display of a purchase screen, then once the transaction has been carried out, the display of the content stream purchased, or indirectly by Internet or telephone allowing access to the pay TV content once the transaction is completed.

In an embodiment, the TV receiver 5 is suitable for receiving content-transport streams from various sources (for example, one stream source is transported by ADSL, another source by wireless route) and the list of identifiers of the streams proposed by the TV receiver 5 during the creation of a mosaic comprises the identifiers of content streams transmitted by the is various sources.

In an embodiment, content streams other than TV programs over ADSL or wireless route are transmitted to the TV receiver 5, for example content streams over IP route (IP TV or IP radio contents), the list of stream identifiers proposed in the area Z2 then proposes the identifiers of such content streams.

In the embodiment described above, the video streams are requested by the TV receiver from the device 3 as corresponding commands are inputted by the user. In another embodiment, all of the SPTS streams are continuously sent to the TV receiver.

In an embodiment, all or some of the steps carried out by the processing module 8 are implemented during execution, by processing means of the processing module 8, of a program comprising instructions for implementing these steps. This program is based for example on HTML and Javascript technologies.

The embodiment described with reference to the figures considers a table of square or rectangular mosaic elements. The invention can of course be implemented with mosaics having other shapes and/or mosaic elements with other shapes: for example, a mosaic in a "flower" arrangement with mosaic elements in the shape of petals or semi-circles (the centre of the flower allowing in particular presentation in zoom mode in front of the mosaic element on which the cursor is located), or mosaic elements in the shape of a parallelogram arranged diagonally etc.

The invention claimed is:

1. A method for the generation of a mosaic comprising a plurality of content-transport streams by a module, said streams being received as separate single streams by the module, said method comprising the following steps, after displaying a screen comprising at least a first area intended for displaying a mosaic and a second area comprising a content identifier list:
   detecting a command selecting an identifier from the list coming from a user control interface;
   obtaining from the user control interface a movement to be applied to said identifier from its position in the list to a determined location in the first area;
   successively modifying the definition of the screen by adding a representation of the selected identifier and moving it into successive respective positions along the applied movement and transmitting the modified screen definition to the display device in order to display the successively modified screen;

modifying the definition of the screen by adding a mosaic element showing the stream representing the content identified by the selected identifier in the first area while said second area comprising said content identifier list is still displayed on the screen;

transmitting the screen definition data to the display device for displaying the modified screen.

2. The method according to claim 1 wherein, the command also indicates a determined location in the first area, the definition of the screen is modified by adding a mosaic element in the first area, showing the stream representing the content identified by the selected identifier at the location indicated.

3. The method according to claim 1, wherein, among the contents, those authorized for viewing are determined and according to which the identifiers of the list to be displayed in the second area are the determined content identifiers.

4. The method according to claim 1, wherein, following the detection of at least one command coming from the control interface indicating scrolling in a given direction of the list of identifiers:

the definition of the screen is modified by removing at least one content identifier previously displayed at one end of the list in the second area and by adding at least one content identifier not previously displayed in the list to the other end of the list;

the screen definition data are transmitted to the display device in order to display the modified screen.

5. The method according to claim 1, said method further comprising the following steps:

detecting a command, coming from the control interface, selecting a mosaic element situated at a first determined location in the first area and indicating a movement from the first location to a second location in the first area;

successively modifying the definition of the screen by moving the selected mosaic element into successive respective positions along the movement indicated; and transmitting the screen definition data to the display device in order to display the successively modified screen.

6. A computer program to be installed in a module capable of receiving content-transport streams, capable of receiving commands transmitted from a control interface and capable of sending screen definition data to a display device in order to display the thus-defined screen, said program comprising instructions for implementing the steps of a method according to claim 1 during execution of the program by processing means of said module.

7. A module capable of receiving content-transport streams, capable of receiving commands transmitted from a control interface and capable of sending screen definition data to a display device in order to display said screen, said module being suitable for implementing the steps of a method according to claim 1.

8. A television receiver comprising a module capable of receiving content-transport streams, capable of receiving commands transmitted from a control interface and capable of sending definition data to a display device in order to display said screen, said module being suitable for implementing the steps of a method according to claim 1.

9. A screen definition data intended for display on a display device, comprising at least a first area intended for the display of a content-transport stream mosaic and a second area comprising a content identifier list, said screen definition data being obtained following the implementation of a method according to claim 1.

* * * * *